United States Patent Office 3,718,311
Patented Feb. 27, 1973

3,718,311
SELF-ADJUSTING STOP VALVE ACTUATING MECHANISM
John R. Braden, 315 Dewey Drive,
Annapolis, Md. 21401
Filed Nov. 24, 1971, Ser. No. 201,785
Int. Cl. F16k 31/44
U.S. Cl. 251—77    6 Claims

ABSTRACT OF THE DISCLOSURE

The invention is a high pressure stop valve with a non-rotating stem which utilizes a pre-loaded spring assembly for applying a closing force to the valve stem.

---

The invention described herein may be manufactured and used by or for the Government of the United States of America for governmental purposes without the payment of any royalties thereon or therefor.

BACKGROUND OF THE INVENTION

In recent years there has been a need to obtain a stop valve which will give safe and dependable service in high pressure, 3000 p.s.i., gas systems. Most of the emphasis has been placed on oxygen valves because of the critical need for better valves for this service, and the inherent danger connected with handling high pressure oxygen. The criteria for such a valve includes: bellows or diaphragm stem seals; positive stops at open and close position; and, a non-metallic valve seat with a metal-to-metal backup seat, available in case of failure of the primary seat. The present invention meets this criteria and provides a valve which will operate smoothly and reliably.

SUMMARY OF THE INVENTION

The invention is a self-adjusting stop valve actuating mechanism which utilizes the concept of a pre-loaded spring assembly for applying the closing force to the valve stem.

OBJECTS OF THE INVENTION

It is a primary object of the instant invention to provide a high pressure, self-adjusting, stop valve actuating mechanism which is simple, reliable and economical for actuating stop valves with non-rotating stems.

It is a further object of the instant invention to provide a mechanism which could be utilized as a safety valve with a simple change in spring force.

DESCRIPTION OF THE PREFERRED EMBODIMENT

Figure 1:
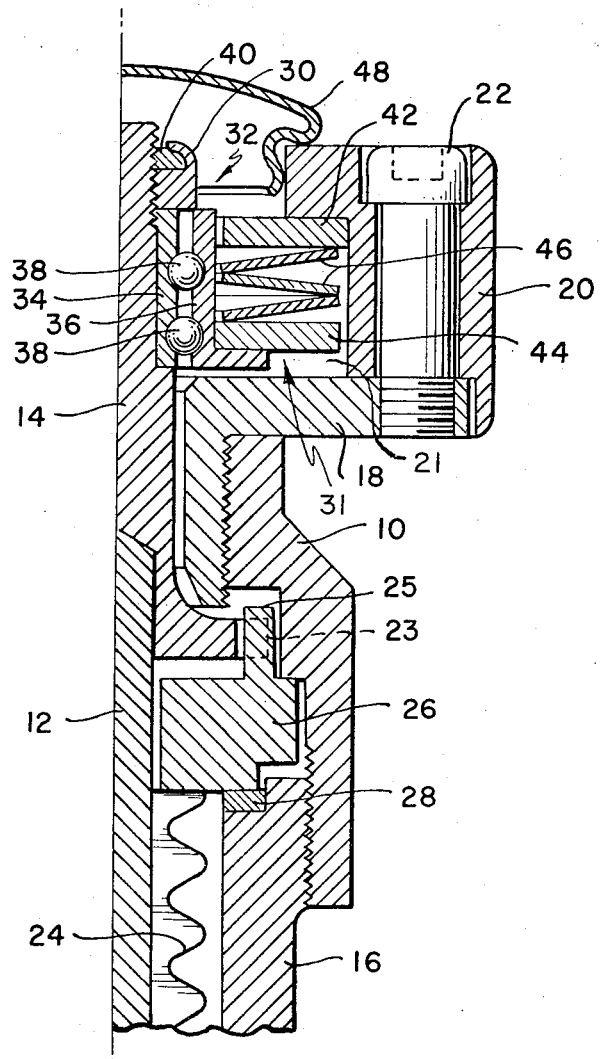
FIG. 1 shows a half-section view of the self-adjusting mechanism.

The general concept of utilizing a pre-loaded spring assembly for applying the closing force to the valve stem offers several advantages over the conventional method of transmitting the movement of the actuating screw directly to the valve stem. Specifically, pre-loaded spring assemblies compensate for seat wear or failure. This design provides a valve which automatically closes onto a secondary seat in case the primary non-metallic seat fails. By providing positive stops, handwheel travel overloads of the valve stem and seat are prevented. With continued reference to the drawing, FIG. 1 illustrates the actuating mechanism which comprises a bonnet closure piece 26 with lugs 25 to prevent rotation of the valve stem 12 via connecting piece 14. One lug is located on each side of the projection 23 extending from connecting piece 14. It would be possible to manufacture the valve stem 12 and connecting piece 14 as an integral unit, but, a two-piece design is preferred for ease of assembly. The valve is a bellows type valve utilizing bellows seal 24 connected to bonnet closure piece 26. Sealing member 28 is provided to seal bonnet closure piece 26 with respect to the tank 16. Bonnet closure piece 26 is held in position by the bonnet nut 10. Actuating screw 18, which engages the threads in the bonnet nut 10, has a flange for attaching the valve handle 20. The handle 20 contains a pre-loaded spring assembly 31. The pre-loaded spring assembly 31 consists of top plate 42, bottom plate 44, and resilient means 46. The resilient means illustrated are Belleville washers. The valve handle 20 is secured to the actuating screw 18 by a bolt 22, or similar securing means. The pre-loaded spring assembly 31 contacts thrust bearing 32 mounted between the spring assembly and the connecting piece 14. The thrust bearing 32 consists of inner race 34, outer race 36, and ball bearings 38. The thrust bearing is held in position with respect to the connection piece 14 by retaining nut 30 which has a securing means 40. The entire assembly is protected against dirt and other contamination by cover 48.

When the valve is in the open position, the actuating screw 18 has advanced to its upper position and the projection 23 on the connecting piece 14 is in contact with the inner shoulder of the bonnet nut 10. The spring assembly 31 is held in a pre-loaded condition by the flange of the actuating screw 18, mounted to the valve handle 20. The valve is held open by the action of the thrust bearing 32 through the connecting piece 14 to the valve stem 12. When the valve handle 20 is turned to close the valve, the actuating screw 18 advances the handle 20, spring assembly 31, thrust bearing 32, connecting piece 14, and valve stem 12 as a unit until the valve stem 12 contacts the valve seat. At this point, the valve stem 12, connecting piece 14, and thrust bearing 32 stop, but, the valve handle 20 and actuating screw 18 contact the upper surface of the bonnet nut 10. This compresses the spring assembly 31 and creates a clearance space 21 between the spring assembly 31 and the flange of the actuating screw 18. The clearance space 21 is sufficient to allow the valve stem 12 to advance and close on the back-up metal-to-metal seat, propelled by the action of the spring assembly 31. In case the non-metallic seat should be destroyed, no further turning of the valve handle is required for this action to occur.

Figure 2:
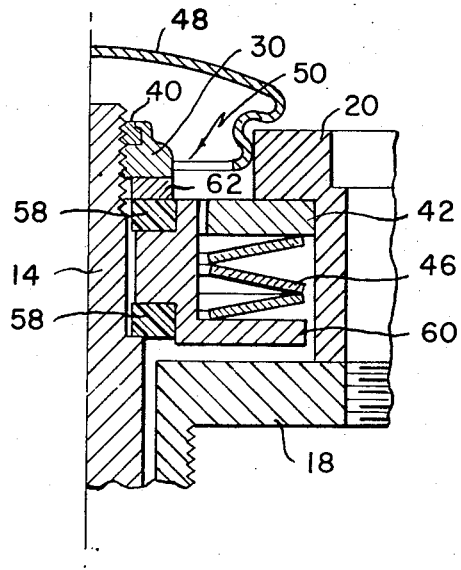
FIG. 2 shows an alternate construction utilizing polyimide thrust bearings.

Other embodiments of the instant invention are shown in FIGS. 2–5. FIG. 2 illustrates a thrust bearing 50 having non-metallic bearings 58. Polyimide material would be suitable. The bottom plate 44 of FIG. 1 is replaced with a retainer piece 60. The polyimide bearing is held in place by a spacer 62.

Figure 3:
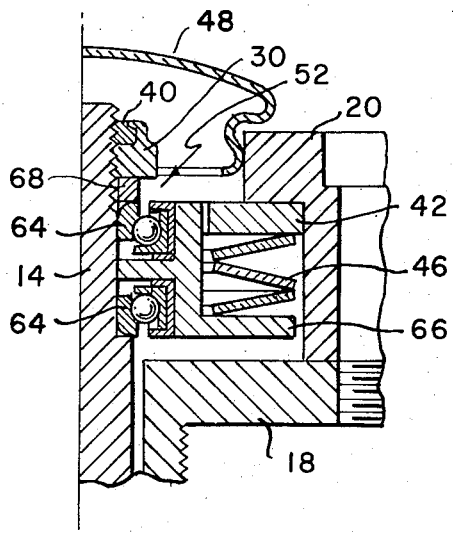
FIG. 3 shows an alternate construction utilizing angular contact unground ball bearings.

FIG. 3 illustrates an embodiment utilizing angular contact unground ball bearings 64 in a thrust bearing 52. The bearings are held in position by a retainer piece 66 and a spacer 68.

Figure 4:
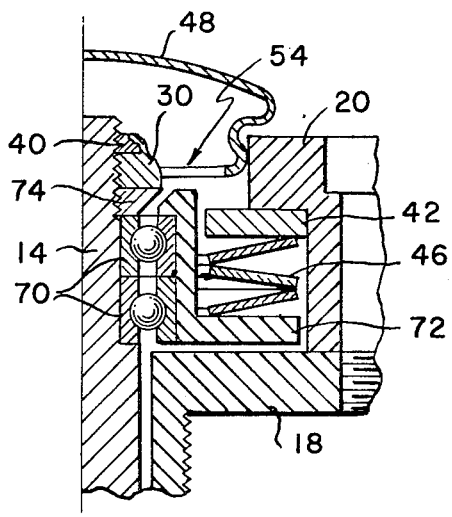
FIG. 4 shows an alternate construction utilizing two sets of standard ball bearings.

FIG. 4 illustrates a thrust bearing 54 utilizing standard ball bearings 70. A retainer means 72 and a spacer 74 hold the two sets of standard ball bearings in place.

Figure 5:
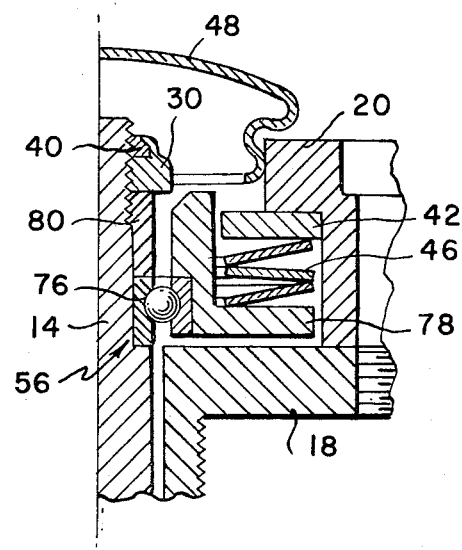
FIG. 5 shows an alternate construction utilizing one set of standard ball bearings.

FIG. 5 illustrates still another thrust washer 56 utilizing only one row of unground ball bearings 76 retained in position by retaining piece 78 and spacer 80.

The assembly described above may be utilized as a safety valve if lighter duty springs are used. Lighter springs will allow the valve to unseat when the force exerted by the pre-loaded spring assembly is overcome.

It is understood that the invention is not limited to the exact details of construction shown and described for obvious modifications will occur to persons skilled in the art. It is therefore to be understood that within the scope of the appended claims, the invention may be practiced otherwise than as specifically described.

What is claimed is:

1. An actuating mechanism for a high pressure stop valve, comprising:
   a valve body having a valve seat;
   a non-rotatable valve stem carrying at one end a valve closure element adapted to seat upon said valve seat;
   thrust bearing means mounted concentrically and rotatably on said stem;
   handle means threadedly engaging said valve body for movement into and out of said valve body corresponding to an open position and a predetermined closed position; and
   resilient means mounted in said handle means interconnecting said thust bearing means and said handle means, said resilient means being compressed by said handle means when said handle means move into the predetermined closed position thereby preloading said thrust bearing means and said valve stem so that as said valve seat wears said resilient means will compensate for the wear.

2. A device as in claim 1 wherein said resilient means is mounted concentrically on said valve stem for rotation about said shaft.

3. A device as in claim 2 wherein said resilient means includes at least one Belleville washer.

4. A device as in claim 3 wherein said thrust bearing means comprises a double-row unground ball bearing with a shoulder on the outer race of the the bearing in contact with the resilient means.

5. A device as in claim 3 wherein said thrust bearing means comprises angular contact unground ball bearings.

6. A device as in claim 3 wherein said thrust bearing means comprises a non-metallic bearing material.

References Cited

UNITED STATES PATENTS 2,977,087   3/1961   Lindgren et al. _____ 251—278 X
3,342,451   9/1967   Matouser _____ 251—77

HENRY T. KLINKSIEK, Primary Examiner

U.S. Cl. X.R.

251—278